F. G. SMITH.
WHEEL.
APPLICATION FILED OCT. 10, 1916.

1,317,230.  
Patented Sept. 30, 1919.

Frank G. Smith Inventor  
By his Attorney

UNITED STATES PATENT OFFICE.

FRANK G. SMITH, OF ELIZABETH, NEW JERSEY.

WHEEL.

1,317,230.  Specification of Letters Patent.  Patented Sept. 30, 1919.

Application filed October 10, 1916. Serial No. 124,842.

*To all whom it may concern:*

Be it known that I, FRANK G. SMITH, a citizen of the United States, residing at Elizabeth, in the county of Union and State of New Jersey, have invented certain new and useful Improvements in Wheels, of which the following is a specification, reference being had therein to the accompanying drawing.

My invention relates to improvements in wheels, and more particularly has reference to wheels provided with interlocking spokes and rims, a construction which provides for the renewal of parts of a wheel as may be required and which facilitates the construction of a wheel having resilient properties.

Figure 1:
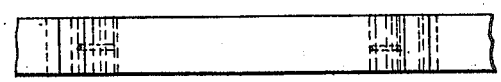
Figure 2:
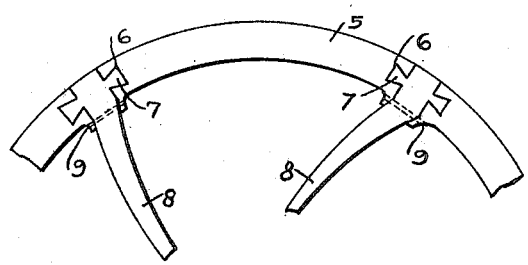
Figure 3:
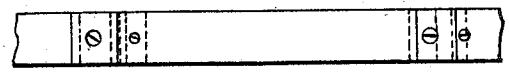

In the accompanying drawings I have illustrated Figure 1 a plan of part of such a wheel, and Fig. 2 is a view looking upwardly at the same. Fig. 3 is a similar plan view of a modification, and Fig. 4 a view looking upwardly at Fig. 3.

5 indicates a section of the rim provided with grooves such as 6 at opposite ends, the same being adapted to receive a projection 7 provided at the ends of the spokes 8, and 9 indicates a suitable pin or bolt which may be employed as an additional security for holding the combination in position.

Figure 4:
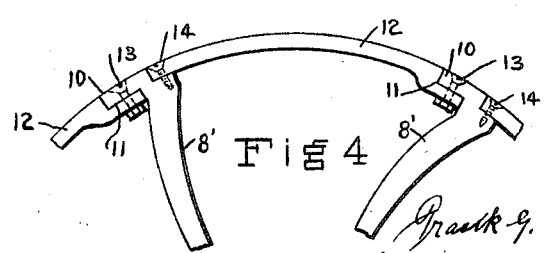

In the modification shown in Figs. 3 and 4 the spokes 8' are provided with offsets at the end such as 10 which are adapted to engage the recess 11 in the rim 12, and 13 indicates a suitable screw or bolt for holding the combination in position. 14 indicates an extra screw or other suitable fastening means which may also be employed as an additional fastening means.

From the construction shown it will be readily observed that a section of the rim may be readily removed or a spoke and that the same may be replaced for purposes of repair from time to time by any one not necessarily familiar with the manufacture of wheels. It will also be readily observed that the rims or spokes may be made of resilient material and the spokes being curved as shown will add additional resilient property to the wheel; thus absorbing the shocks and jars upon the same in use.

Of course it will be understood that various modifications may be made without departing from the spirit of the invention as claimed.

I claim:

A wheel comprising a sectional rim and interlocking spokes, each of said spokes having an overhanging flange on one side and a shoulder upon the opposite side and each of said rim sections having an underhanging flange adapted to engage said overhanging flange of said spoke, and at the opposite end adapted to engage the shoulder of the adjacent spoke.

In testimony whereof I hereunto affix my signature in the presence of two witnesses.

FRANK G. SMITH.

Witnesses:
 LOUISE ENDERLE,
 THOMAS A. HILL.

Copies of this patent may be obtained for five cents each, by addressing the "Commissioner of Patents, Washington, D. C."